United States Patent Office 2,855,398
Patented Oct. 7, 1958

2,855,398

AMIDINES OF THE INDOLE SERIES

Walter Voegtli, Basel, Switzerland, assignor to G. D. Searle & Co., Chicago, Ill., a corporation of Delaware No Drawing. Application November 19, 1956
Serial No. 622,764

9 Claims. (Cl. 260—288)

The present invention relates to amidines containing an indole nucleus, and to non-toxic salts thereof. The amidines of the present invention, in the forms of their free bases, can be represented by the general structural formula

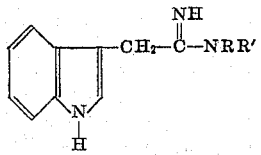

wherein R and R' can represent hydrogen or hydrocarbon substituents. R and R' can each represent hydrogen, in which case the group NRR' is the amino radical, and the compound thus designated is 1-amino-2-(3-indolyl)ethylidenimine (synonym: 3-indolacetamidine). R and R' can represent lower alkyl radicals, such as methyl, ethyl, propyl, butyl, amyl, hexyl, heptyl, octyl, and branched-chain isomers thereof, in which case the group NRR' is a di-(lower)alkylamino radical and the compounds thereby designated are 1-di(lower alkyl)-amino-2-(3-indolyl)ethylidenimines (synonym: N,N-di-(lower)alkyl-3-indolacetamidines). In addition, R and R' can be combined to constitute an alkylene radical or a hydrocarbon-substituted alkylene radical, in which case a cyclic amino structure is formed, and the group NRR' assumes the form

wherein Z is defined as a bivalent hydrocarbon residue having more than 3 and fewer than 10 carbon atoms. For example, Z can represent the tetramethylene radical, in which case NRR' represents the pyrrolidino radical; or Z can represent the pentamethylene radical, in which case NRR' represents the piperidino radical. Z can represent other homologous polymethylene radicals and lower alkyl substitution products thereof, subject to the aforementioned limitation that the entire group so represented is to have more than 3 and fewer than 10 carbon atoms. Z can also represent polymethylene radicals and other alkylene radicals (including unsaturated alkylene radicals) substituted by hydrocarbon substituents other than alkyl groups, representatively hydrocarbon substituents selected in a manner such that the radical NRR' is a bicyclic structure. Thus, when Z is the hydrocarbon residue

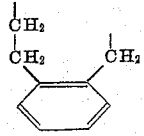

the group NRR' represents the tetrahydroisoquinolino radical, and when Z is the hydrocarbon residue

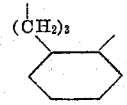

the group NRR' represents the decahydroquinolino radical.

In the manufacture of the compounds of the present invention, 3-indolacetonitrile is converted by reaction with a lower alkanol and hydrogen chloride in an ethereal solvent to an imido ester hydrochloride, more particularly to a lower alkyl ester of 3-indolacetimidic acid hydrochloride of the structural formula

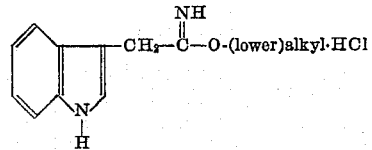

(Compounds of this type are sometimes also known as imido ethers.)

Upon reaction of a lower alkyl ester of 3-indolacetimidic acid hydrochloride, suitably in a lower alkanol, with a compound of the formula

HNRR' the group NRR' being defined as hereinbefore, there is formed an amidine of the structure set forth in the introductory paragraph of this specification. The amidine can be isolated directly from the reaction mixture as its hydrochloride, or, after basification by such means as adding potassium carbonate, as the free base. The amidines formed by reaction of the imido ester with amines can be named as hydrocarbon substitution products of 3-indolacetamidine, or alternatively as amino substitution products of 2-(3-indolyl)ethylidenimine (synonym: 3-indolethylidenimine).

The organic bases described herein form non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. Such non-toxic acid-addition salts, formed by admixture of the organic free base with the acid, suitably in a neutral solvent, are equivalent to the free bases for the purposes of this invention.

The compounds of this invention have useful pharmaceutical properties. They are orally-active diuretic agents, and are particularly effective in promoting the urinary excretion of sodium. They also have anti-emetic and spasmolytic properties, and in application of the latter property can be employed in the treatment of smooth muscle spasm.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

*Example 1*

To a solution of 15.6 parts of 3-indolacetonitrile in 70 parts of anhydrous ether there is added 5.0 parts of anhydrous ethanol. While the solution is maintained near 0° C. with an external cooling bath, 4.0 parts of dry hydrogen chloride is gradually added by introducing a stream of this gas well below the surface of the solution. The mixture becomes red, and after standing for from 1–3 days under refrigeration, an insoluble product separates. When this product has fully crystallized, it is collected on a filter, washed by resuspension in anhydrous ether, and again collected. After drying, it melts with decomposition at about 128° C. This compound is the ethyl ester of 3-indolacetimidic acid hydrochloride. The structural formula of the free base is

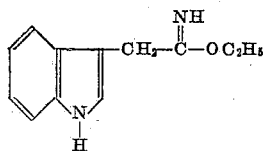

Example 2

To a suspension of 6.4 parts of the ethyl ester of 3-indolacetimidic acid hydrochloride in 16 parts of anhydrous ethanol is added a solution of 0.6 part of ammonia in 6 parts of anhydrous ethanol. The mixture is stirred for 24 hours at about 25° C., during which time all of the starting material dissolves and a clear solution results. The reaction mixture is allowed to stand for one more day, after which the solvent is removed by vaporization under reduced pressure. The oily residue is dissolved in about 5 parts of methanol, and the solution is diluted with 100 parts of ice water containing a small amount of hydrochloric acid. The turbid mixture is washed with ether, with ethyl acetate, and again with ether. These washings are discarded. The aqueous solution is mixed with ice and rendered alkaline with 8% sodium hydroxide solution, whereupon there separates a crystalline precipitate of the desired free base, 1-amino-2-(3-indolyl)ethylidenimine (synonym: 3-indolacetamidine), which has the structural formula

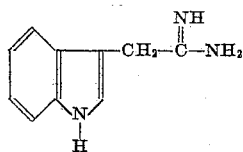

The free base is dissolved in 70 parts of ethyl acetate, and the aqueous liquor is extracted with 60 parts of ether. The ethyl acetate and ether solutions are combined, washed twice with ice water, and dried over sodium sulfate. The sodium sulfate is removed by filtration, and the filtrate is poured into a solution of 4 parts of maleic acid in 4 parts of ethanol. There is then added about 80 parts of a mixture of ethyl acetate and ether containing equal parts by volume of each component, and crystallization is induced by such means as scratching the walls of the reaction vessel with a glass rod and diluting with further quantities of ether. When crystallization is complete, the product is collected on a filter and washed with ether. This compound is the maleate which melts at about 177–178° C. If a more highly purified product is desired, it is obtained by recrystallization from a mixture of acetone (preferably containing a small amount of isopropyl alcohol) and ethyl acetate.

Example 3

To a suspension of 5 parts of the ethyl ester of 3-indolacetimidic acid hydrochloride in 16 parts of anhydrous ethanol is added 2 parts of diethylamine in 8 parts of anhydrous ethanol. The mixture is stirred until a substantially clear solution results, after which it is maintained at about 25° C. for 4 days in a sealed reaction vessel. The mixture is agitated intermittently during this time. The crystalline product present after the 4-day reaction period is collected on a filter and washed with ethanol. This compound is the hydrochloride of 1-diethylamino-2-(3-indolyl)ethylidenimine (synonym: N,N-diethyl-3-indolacetamidine) and it melts at about 260–261° C. It can be recrystallized from a mixture of methanol and ethyl acetate. The structural formula of the free base is

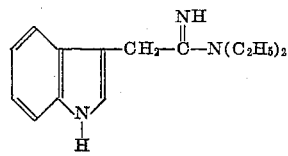

Example 4

Dibutylamine (7.8 parts) is added to a suspension of 11.9 parts of the ethyl ester of 3-indolacetimidic acid hydrochloride in 24 parts of anhydrous ethanol. A clear solution forms, followed quickly by the separation of a crystalline mass. The mixture is maintained in a sealed reaction vessel at about 25° C. for 6 days, with intermittent shaking or stirring. During this period of time the original crystalline mass redissolves, and a solution is again obtained. The ethanol is removed by vaporization in a vacuum, and the non-volatile residue is dissolved in chloroform. The chloroform solution is washed with several small portions of dilute hydrochloric acid. The chloroform phase, in which the hydrochloride of the desired compound is quite soluble, is diluted with ether until there is substantial precipitation of a dark, oily product. The suspension of oil in chloroform and ether is extracted twice with ice cold, dilute hydrochloric acid, and the combined, aqueous acidic extract is washed twice with ether and, after the addition of ice, is made alkaline by the addition of potassium carbonate. The resulting free base is removed by extraction with several portions of chloroform, and the combined chloroform extract is dried over sodium sulfate, filtered, and concentrated to dryness in a vacuum. The solid residue is crystallized twice from acetone, whereby there is obtained 1-dibutylamino-2-(3-indolyl)-ethylidenimine (synonym: N,N-dibutyl-3-indolacetamidine) which melts at about 130–131° C. and has the structural formula A solution of 4 parts of this free base in 23 parts of chloroform is treated with a slight excess over one molecular equivalent of hydrogen chloride in isopropyl alcohol, and the mixture is diluted with ether. The crystalline product is collected on a filter and washed with mixtures of chloroform and ether and then with ether. This compound is the hydrochloride which melts at about 155–157° C. after prior softening.

Example 5

A solution is prepared from 11.9 parts of the ethyl ester of 3-indolacetimidic acid hydrochloride, 24 parts of anhydrous ethanol and 4.3 parts of pyrrolidine. Within a few minutes crystals begin to separate from the solution. The reaction mixture is maintained in a sealed reaction vessel for 9 days at about 25° C., with intermittent shaking or stirring. At the end of this time the crystalline product which is present is collected on a filter and washed by resuspension in a small amount of isopropyl alcohol and then in ether. This product is recrystallized from a mixture of methanol and ethyl acetate whereby there is obtained the purified hydrochloride of 2-(3-indolyl)-1-pyrrolidinoethylidenimine (synonym: N,N-tetramethylene-3-indolacetamidine) which melts at about 270–271° C. The structural formula of the free base is

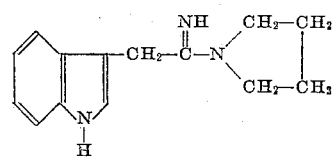

By the foregoing procedure, with the substitution of 5.1 parts of piperidine for the pyrrolidine, the compound obtained is the hydrochloride of 2-(3-indolyl)-1-piperidinoethylidenimine (synonym: N,N-pentamethylene-3-indolacetamidine).

*Example 6*

To a suspension of 11.9 parts of the ethyl ester of 3-indolacetimidic acid hydrochloride in 24 parts of anhydrous ethanol is added 5.9 parts of 4-methylpiperidine. The resulting reaction mixture is maintained, with periodic shaking or stirring, for 8 days at about 25° C. At the end of this time the insoluble product is collected and washed with a small amount of isopropyl alcohol and then with ether. This compound is the hydrochloride of 2 - (3 - indolyl) - 1 - (p - methylpiperidino)ethylidenimine (synonym: α - (4 - methylpiperidino) - 3 - indolethylidenimine). The structural formula of the free base is

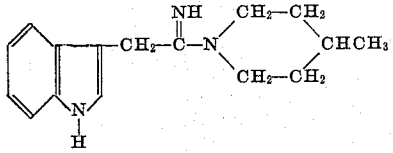

*Example 7*

A reaction mixture is prepared by adding 8.0 parts of tetrahydroisoquinoline to a suspension of 11.9 parts of the ethyl ester of 3-indolacetimidic acid hydrochloride in 24 parts of anhydrous ethanol. A clear solution can exist briefly upon admixture of the reagents, but within a short period of time a crystalline mass precipitates. The reaction mixture is maintained in a sealed reaction vessel for 8 days at about 25° C., during which time it is subjected to intermittent shaking or stirring. The solid product is collected on a filter and washed with a small amount of isopropyl alcohol and then with ether. The product obtained in this manner gives a clear solution in hot water and is of good quality, but a product of slightly higher purity is obtained by recrystallization from a mixture of acetic acid and ethyl acetate. The compound thus obtained melts at about 269–270° C. and is the hydrochloride of 1-tetrahydroisoquinolino-2-(3-indolyl)ethylidenimine (synonym: α-(tetrahydroisoquinolino)3-indolethylidenimine). The free base, obtained by adding potassium carbonate to a cold, aqueous solution of the hydrochloride, has the structural formula

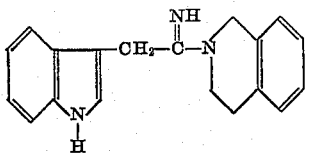

What is claimed is:

1. A member of the class consisting of bases and non-toxic acid addition salts thereof, said bases having the structural formula

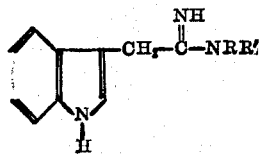

wherein the group NRR' is a member of the class consisting of amino, di(lower alkyl)amino, pyrrolidino, piperidino, p-(lower alkyl)piperidino, and tetrahydroisoquinolino radicals.

2. 1-amino-2-(3-indolyl)ethylidenimine.
3. 1-dialkylamino-2-(3-indolyl)ethylidenimine.
4. 1-diethylamino-2-(3-indolyl)ethylidenimine.
5. 1-dibutylamino-2-(3-indolyl)ethylidenimine.
6. A compound of the structural formula

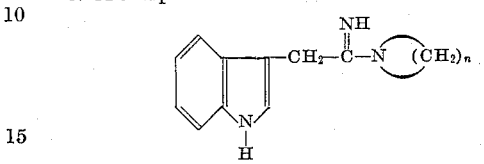

wherein $n$ is an integer greater than three and less than six.

7. 2-(3-indolyl)-1-pyrrolidinoethylidenimine.
8. 1-tetrahydroisoquinolino-2-(3 - indolyl) - ethylidenimine.
9. A process which comprises treating a compound which as a free base has the formula

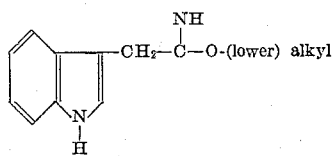

with a compound of the formula

HNRR' and isolating a compound which as a free base has the formula

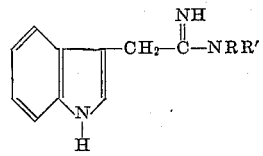

in which formulas NRR' is selected from the group consisting of amino, di(lower alkyl)amino, pyrrolidino, piperidino, p-(lower alkyl)piperidino, and tetrahydroisoquinolino radicals.

References Cited in the file of this patent

Karrer: Organic Chemistry, 2nd English Edition, 1946, page 212, Elsevier Publishing Co.

UNITED STATES PATENT OFFICE
Certificate of Correction

Patent No. 2,855,398                 October 7, 1958

Walter Voegtli

It is hereby certified that error appears in the printed specification of the above numbered patent requiring correction and that the said Letters Patent should read as corrected below.

Column 4, line 39, after "the structural formula" and before the paragraph beginning with "A solution of 4 parts" insert the following formula:

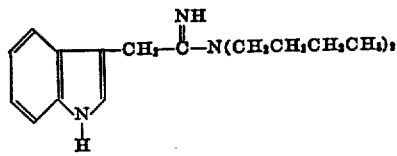

column 6, lines 24 to 30, the formula should appear as shown below instead of as in the patent:

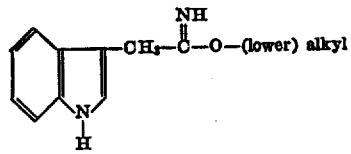

Signed and sealed this 23rd day of December 1958.

[SEAL]

Attest:
KARL H. AXLINE,
*Attesting Officer.*

ROBERT C. WATSON,
*Commissioner of Patents.*